(12) United States Patent
Sevindik

(10) Patent No.: US 11,445,439 B1
(45) Date of Patent: Sep. 13, 2022

(54) MANAGING POWER OVER ETHERNET THROUGH A SWITCH

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/189,230

(22) Filed: Mar. 1, 2021

(51) Int. Cl.
  *H04W 52/02* (2009.01)
  *H04L 12/28* (2006.01)
  *H04L 12/10* (2006.01)
  *H04L 12/40* (2006.01)

(52) U.S. Cl.
  CPC ......... *H04W 52/0216* (2013.01); *H04L 12/10* (2013.01); *H04L 12/2801* (2013.01); *H04L 12/40045* (2013.01)

(58) Field of Classification Search
  CPC ............... H04W 52/0216; H04L 12/10; H04L 12/2801; H04L 12/40045
  See application file for complete search history.

(56) References Cited

U.S. PATENT DOCUMENTS

| | | | |
|---|---|---|---|
| 10,060,965 B1* | 8/2018 | Skinner | G01R 31/086 |
| 10,116,381 B1* | 10/2018 | Smyth | H04B 7/18519 |
| 10,271,351 B1* | 4/2019 | Wang | H04W 16/14 |
| 10,880,840 B1* | 12/2020 | Mansour | H04W 52/367 |
| 2005/0268120 A1* | 12/2005 | Schindler | G06F 16/9537 |
| | | | 713/300 |
| 2008/0318520 A1* | 12/2008 | Kwun | H04B 7/0639 |
| | | | 455/7 |
| 2009/0182854 A1* | 7/2009 | Sun | H04L 49/351 |
| | | | 709/223 |
| 2013/0166236 A1* | 6/2013 | Vladan | G06F 1/266 |
| | | | 702/64 |
| 2016/0381666 A1* | 12/2016 | Kim | H04W 72/042 |
| | | | 370/329 |
| 2018/0150127 A1* | 5/2018 | Wendt | G06F 1/266 |
| 2019/0058999 A1* | 2/2019 | Gunasekara | H04W 36/0022 |
| 2019/0312751 A1* | 10/2019 | Goergen | H04L 12/40039 |
| 2022/0070019 A1* | 3/2022 | Hebeisen | E06B 9/72 |

* cited by examiner

*Primary Examiner* — Stephen J Clawson
(74) *Attorney, Agent, or Firm* — Dority & Manning, P.A.

(57) ABSTRACT

The embodiments disclosed herein provide managing power over Ethernet through a switch. In particular, the embodiments provide a mechanism for a Power Over Ethernet (POE) switch device to request change of operation of Citizens Broadband Radio Service Devices (CBSDs) to dynamically adjust power requirements of the CBSDs. The POE switch device is configured to determine a power transfer rate is outside a predetermined range, and send a request to an identified CBSD of a plurality of CBSDs to operate under a different power mode to alter a power requirement of the identified CBSD. In this way, the POE switch device dynamically manages operation of the plurality of CBSDs and distributes power among the plurality of CBSDs based on power requirements, loads, and/or Spectrum Access Systems (SAS) limitations of the plurality of CBSDs. Such a configuration increases the number and/or type of CBSDs that can be deployed in a particular region.

20 Claims, 9 Drawing Sheets

MANAGING POWER OVER ETHERNET THROUGH A SWITCH

BACKGROUND

For strand-based deployment of a Citizens Broadband Radio Service (CBRS) network, Citizens Broadband Radio Service Devices (CBSDs) may be placed on and powered by a cable strand. Multiple CBSDs may be powered via a Power Over Ethernet (POE) switch device. However, deploying and/or expanding such a network may be limited or complicated by power requirements of the POE switch device and/or CBSDs.

SUMMARY

The embodiments disclosed herein provide managing Power Over Ethernet through a switch. In particular, the embodiments provide a mechanism for a Power Over Ethernet (POE) switch device to request change of operation of Citizens Broadband Radio Service Devices (CBSDs) to dynamically adjust power requirements of the CBSDs. The POE switch device is configured to determine a power transfer rate is outside a predetermined range and send a request to an identified CBSD of a plurality of CBSDs to operate under a different power mode to alter a power requirement of the identified CBSD. In this way, the POE switch device dynamically manages operation of the plurality of CBSDs and distributes power among the plurality of CBSDs based on power requirements, loads, and/or Spectrum Access Systems (SAS) limitations of the plurality of CBSDs. Such a configuration increases the number and/or type of CBSDs that can be deployed in a particular region.

In one embodiment, an electronic device is provided. The electronic device includes an upstream Power Over Ethernet (POE) port configured to receive power from a cable modem termination system (CMTS). The electronic device further includes a plurality of downstream POE ports configured to transfer power to a corresponding plurality of Citizens Broadband Radio Service devices (CBSDs). The electronic device further includes a memory and a processor device coupled to the memory. The processor device is configured to transfer power from the CMTS to the plurality of CBSDs via the corresponding plurality of downstream POE ports. The processor device is further configured to determine a power transfer rate from the CMTS to the plurality of CBSDs is outside of a predetermined range. The processor device is further configured to, based on the power transfer rate, send a request via the downstream POE port to a first CBSD of the plurality of CBSDs to operate under a different power mode than a current power mode to alter a power requirement of the first CBSD.

In another embodiment, a method is provided. The method includes directing, by an electronic device, power transfer from a cable modem termination system (CMTS) via an upstream Power Over Ethernet (POE) port to a plurality of Citizens Broadband Radio Service Devices (CBSDs) via a corresponding plurality of downstream POE ports. The method further includes determining, by the electronic device, a power transfer rate from the CMTS to the plurality of CBSDs outside of a predetermined range. The method further includes, based on the power transfer rate, sending a request by the electronic device via one of the plurality of downstream POE ports to a first CBSD of the plurality of CBSDs to operate under a different power mode than a current power mode to alter a power requirement of the first CBSD.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
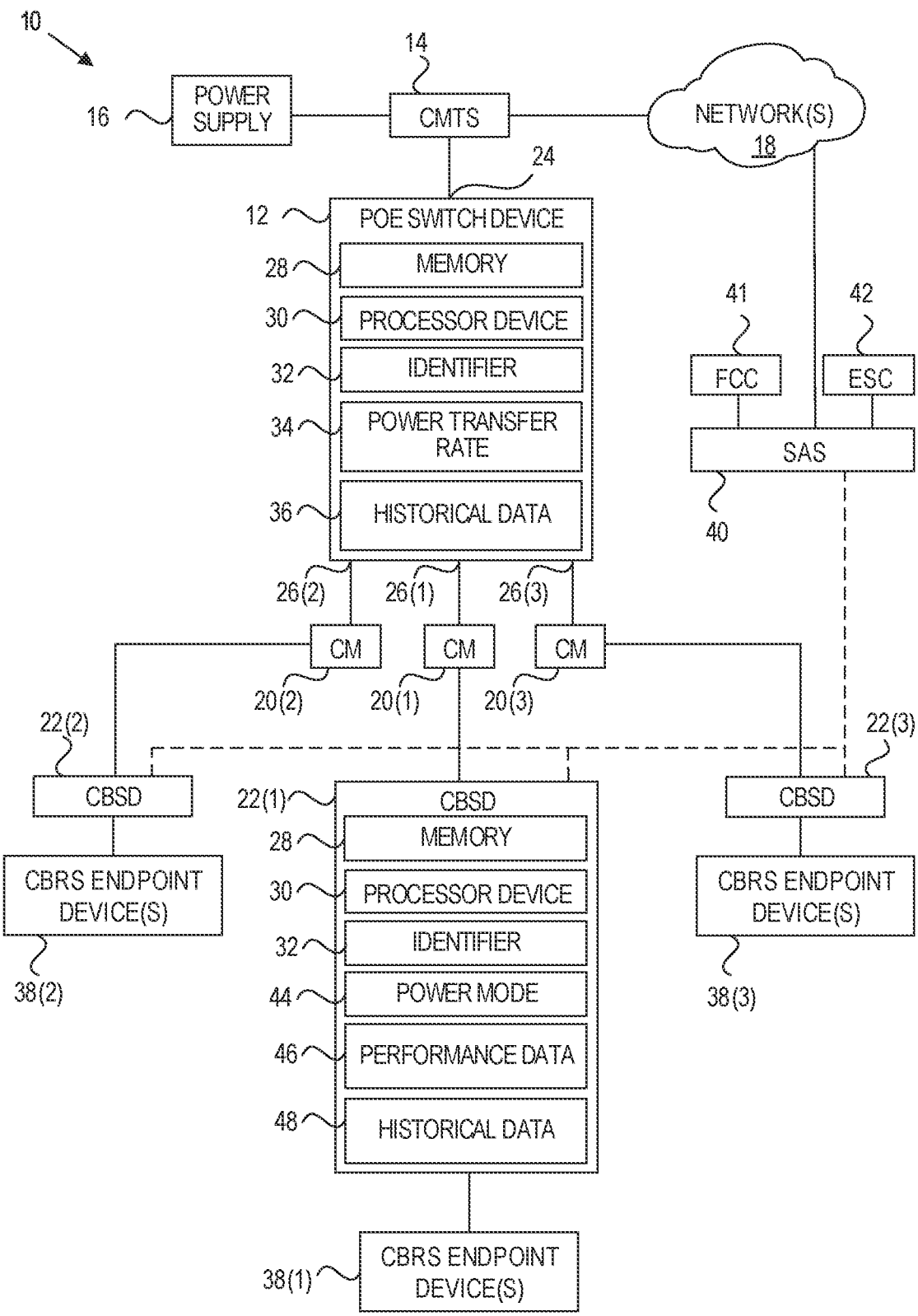
FIG. 1 is a block diagram of a system for managing power over Ethernet illustrating certain aspects of various embodiments disclosed herein.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The embodiments disclosed herein provide managing power over Ethernet through a switch. In particular, the embodiments provide a mechanism for a Power Over Ethernet (POE) switch device to request change of operation of Citizens Broadband Radio Service Devices (CBSDs) to dynamically adjust power requirements of the CBSDs. The POE switch device is configured to determine a power transfer rate is outside a predetermined range and send a request to an identified CBSD of a plurality of CBSDs to operate under a different power mode to alter a power requirement of the identified CBSD. In this way, the POE switch device dynamically manages operation of the plurality of CBSDs and distributes power among the plurality of CBSDs based on power requirements, loads, and/or Spectrum Access Systems (SAS) limitations of the plurality of CBSDs. Such a configuration increases the number and/or type of CBSDs that can be deployed in a particular region.

For strand-based deployment of a Citizens Broadband Radio Service (CBRS) network, CBSDs are placed on and powered by a cable strand. In particular, cable modems (CM) provide backhaul connection and power to the CBSDs. The CMs (and the CBSDs) are coupled with and receive power from a POE switch device (a slave device), which is coupled to a cable modem termination system (CMTS). Generally, CBSDs operate under two categories, Category A (may be referred to as CAT-A) and Category B (may also be referred to as CAT-B). CAT-A CBSDs transmit a maximum Effective Isotropic Radiated Power (EIRP) of about 1 Watt, while CAT-B CBSDs transmit a maximum EIRP of about 50 Watts. On-strand CBSDs are usually limited to CAT-A because of limited power provided on-strand and the high power requirements of CAT-B CBSDs. Even then, the POE switch device has limited power it can supply, even to all CAT-A CBSDs, thereby limiting the number and type of CBSDs that can be deployed. Accordingly, power management and mitigation measures are needed to dynamically manage power provided to the CBSDs, thereby increasing the type and/or number of CBSDs that can be deployed.

The embodiments provided herein facilitate an improvement to computer functionality by providing a system that manages power over Ethernet through a switch. In particular, the POE switch device dynamically manages operation of a plurality of CBSDs and distributes power to the plurality of CBSDs. Such a configuration increases the number of CBSDs that can be deployed in a particular region. In other words, the POE switch device monitors, analyzes, and/or adjusts operation of the plurality of CBSDs based on current and/or historical data. Thus, the examples are directed to specific improvements in computer functionality.

The embodiments provided herein employ a new kind of POE switch device that manages operation of CBSDs to increase deployment of CBSDs. Previously, POE switch devices were slave devices without any intelligence. The POE switch device of the current disclosure is able to monitor, analyze, and/or adjust operation of a plurality of CBSDs. Such functionality was not previously available to such computing devices. Accordingly, the embodiments discussed herein are directed to a non-abstract improvement in computer functionality.

FIG. 1 is a block diagram of a system 10 for managing power over Ethernet, illustrating certain aspects of various embodiments disclosed herein. The system 10 includes a POE switch device 12 in communication with and receiving power from a CMTS 14. The CMTS 14 is in communication with a power supply 16 (e.g., power plant) and a communication network 18. The CMTS 14 then delivers power and data to the POE switch device 12. Then the POE switch device 12 delivers power and data to cable modems (CMs) 20(1)-20(3) (referred to generally as CMs 20), which in turn deliver power and data to CBSDs 22(1)-22(3) (referred to generally as CBSDs 22). Accordingly, the POE switch device 12 communicates with and delivers power to the CBSDs 22. It is noted that the CMs 20 and/or CBSDs 22 are exclusively powered only by the POE switch device 12. In other words, the CMs 20 and/or CBSDs 22 are devoid of any other power source other than the POE switch device 12. Further, CMTS 14 and CMs 20 define a Data Over Cable Services Interface Specification (DOCSIS) Network. DOCSIS protocol is used to transfer data over the DOCSIS network. While there are multiple version of the DOCSIS protocol and DOCSIS standard, the systems and methods disclosed herein work with any version of the DOCSIS protocol, DOCSIS standard, and/or other DOCSIS release.

Although only one POE switch device 12 is illustrated, it is noted that multiple POE switch devices 12 may be coupled to the CMTS 14. The POE switch device 12 (may also be referred to as an electronic device, POE switch, switch, etc.) includes an upstream Power Over Ethernet (POE) port 24 configured to receive power and data from the CMTS 14. The POE switch device 12 includes downstream POE ports 26(1)-26(3) (referred to generally as downstream POE ports 26) configured to transfer power and data to a plurality of CBSDs 22. In other words, the POE switch device 12 communicates with and propagates power to the CBSDs 22.

The POE switch device 12 includes a memory 28 and a processor device 30 coupled to the memory 28. The POE switch device 12 further includes an identifier 32 uniquely associated with the POE switch device 12. In certain embodiments, the identifier 32 may include, by way of non-limiting example, a Media Access Control (MAC) address or a serial number. A MAC address is a unique identifier assigned to a network interface controller (NIC) for use as a network address. A serial number is a unique identifier assigned to a device to uniquely identify the device.

The POE switch device 12 manages power delivered to the CMs 20 and/or CBSDs 22. To do so, the POE switch device 12 measures a power transfer rate 34 of power transferred through the POE switch device 12. In particular, the power transfer rate 34 indicates the current power transfer from the CMTS 14 through the POE switch device 12 to the CMs 20 and/or CBSDs 22. Note that the power transfer rate 34 is cumulative of the power being transferred from the POE switch device 12 to all of the CMs 20 and/or CBSDs 22. The POE switch device 12 has a maximum power limit of power that can be transferred (i.e., received by and/or delivered from). To further manage and distribute power to each of the CMs 20 and/or CBSDs 22, the POE switch device 12 records historical data 36 of the POE switch device 12. The POE switch device 12 can use current data and/or historical data of the POE switch device 12 to manage operation of the CBSDs 22 (and thereby manage power delivered to the CBSDs 22).

In certain embodiments, the CMTS 14 is at a cable company's headend (e.g., local office). The CMTS 14 is configured to provide high-speed data services (e.g., fiber internet, cable internet, Voice over Internet Protocol (VoIP), etc.). The CMTS 14 receives signals from the communication network 18 and converts those signals for transmission to the CM 20. Further, the CMTS 14 receives signals from the CM 20 and converts those signals into Internet Protocol (IP) packets for transmission over the communication network 18. As noted above, the CMTS 14 is further configured to receive power from a power supply 16 and transmit power (e.g., via coaxial cables) to the CMs 20 and/or CBSDs 22. As similarly noted above, although only one POE switch device 12 is shown, the CMTS 14 may supply power to multiple POE switch devices 12. As also noted above, CMs 20 provide backhaul connection and power to the CBSDs 22. Accordingly, the CMs 20 transfer communication and power from the POE switch device 12 to a corresponding CBSD 22. In turn, each CBSD 22 communicates with one or more CBRS endpoint devices 38 (e.g., cellphones, computer devices, etc.).

CBSD 22 is a device or base station that supports a CBRS band (e.g., 4G LTE, 5G LTE, etc.) to communicate with CBRS endpoint devices 38 which communicate in the CBRS band. The CBRS band refers to 150 MHz of spectrum between 3.5 GHz to 3.7 GHz designated by the United States Federal Communications Commission (FCC) for sharing among different tiers of users, including incumbent users (e.g., Navy, commercial fixed satellite stations, etc.), priority access license (PAL) users, and general authorized access (GAA) users. The CBRS band utilizes SAS 40 to manage users and sharing of the spectrum (e.g., controlling interference levels). Each CBSD 22 must register with and communicate with a SAS 40 to request authorization to broadcast in the CBRS band. When such a request is made, SAS 40 may consult an FCC database 41 (e.g., to determine tier of user, current regulations, etc.) and/or an Environmental Sensing Capability (ESC) 42. The ESC 42 is a network of sensors to detect use of CBRS, particularly along the coastline. As a result, SAS 40 limits interference within CBRS, as well as between CBRS and radar operations (e.g., of the Navy).

Each CBSD 22 includes a memory 28 and a processor device 30 coupled to the memory 28. Each CBSD 22 includes an identifier 32 uniquely associated with the CBSD 22. CBSDs 22 operate in a power mode 44, such as an off power mode, a lower power mode, and/or a higher power mode. For example, CBSDs 22 generally broadcast in either CAT-A power mode or CAT-B power mode. As noted above, CAT-A CBSDs 22 transmit maximum EIRP of about 1 Watt. CAT-B CBSDs 22 transmit maximum EIRP of about 50 Watts. Some CBSDs 22 are able to broadcast as either CAT-A or CAT-B. However, to do so, the CBSDs 22 must communicate with SAS 40 and receive permission to broadcast as CAT-A or CAT-B. As an example, if SAS 40 determines that there is too much interference, SAS 40 may deny a request from the CBSD 22 to upgrade from CAT-A to CAT-B. Further, if SAS 40 determines there is too much interference, SAS 40 may deny a request from the CBSD 22 to even operate as a CAT-A.

The CBSD 22 sends data, among other information, to the POE switch device 12. For example, the CBSD 22 may send performance data 46, such as current power requirements of each of the plurality of CBSDs 22, current load of each of the plurality of CBSDs 22, etc. Note that the power requirements of the CBSD 22 depend on the load of the CSBD 22, which depends on the number of CBRS endpoint devices 38 in communication with the CBSD 22. The more users, the higher the load, the more power is needed. The CBSD 22 may send historical data 48, such as historical power requirements of each of the plurality of CBSDs 22, historical load of each of the plurality of CBSDs 22, average load during a predetermined time period (e.g., day, week, month, etc.), and/or high load time during a predetermined time period (e.g., day, week, month, etc.), etc. For example, a first CBSD 22(1) may experience high loads every Thursday, from 2 PM to 3 PM, or lower loads during February. Such data accumulates over time, such that patterns generally emerge for use by the POE switch device 12 in managing power distribution to the CBSDs.

The POE switch device 12 receives from the first CBSD 22(1) an identifier 32 (e.g., a MAC address), power mode 44 (e.g., CAT-A, CAT-B, or off power mode), performance data 46 (e.g., power-related issue, a power limit range), and/or historical data 48 (e.g. average load during a predetermined time period, high load time during a predetermined time period), etc. Power-related issues could include rebooting due to lower power, and power limit range includes minimum and maximum power limits. For example, if a CBSD 22 drops below a minimum power limit, the CBSD 22 may keep rebooting and sounding an alarm. Accordingly, the CBSD 22 may need a minimum power limit to prevent such undesirable behavior.

Based on current and/or historical data 36, 48 of the POE switch device 12 and/or the CBSDs 22, the POE switch device 12 is configured to manage power transfer among the plurality of CBSDs 22 to maximize the power transfer rate 34 to the plurality of CBSDs 22 under a predetermined power transfer rate limit. The POE switch device 12 is configured to manage power transfer among the plurality of CBSDs 22 to maximize load, power, coverage, and/or CBRS endpoint devices 38 across the plurality of CBSDs 22. In other words, for example, the POE switch device 12 operates to maximize the number of CBSDs 22 operating in a CAT-B power mode 44. Doing so maximizes the geographic coverage of the CBSDs 22 because CAT-B CBSDs 22 (outputting 50 Watts of power) can broadcast further and provide coverage almost fifty times more than CAT-A CBSDs 22 (outputting 1 Watt of power). Further, if two CBSDs 22 are operating in CAT-B power mode 44 but experience different loads, the POE switch device 12 can determine which of the two CBSDs 22 to request downgrading. The POE switch device 12 can decrease power of a first CBSD 2291) during non-busy hours to increase coverage of a second CBSD 22(2). If the POE switch device 12 has extra power not being utilized, the POE switch device 12 can upgrade a CBSD 22 from CAT-A to CAT-B power mode 44 to increase coverage while experiencing the increased power.

With such information provided by the CBSDs 22, the POE switch 12 can determine times, days, weeks, and/or months with varying loads and/or power requirements (e.g., high loads, high power requirements, low loads, low power requirements, etc.). Such data may be used, for example, to identify which CBSDs 22 may be candidates to receive less or more power, and/or which CBSDs 22 would benefit most from operating as a CAT-B, etc. Further, such data may be used to anticipate loads and power requirements and proactively take steps to mitigate problems and/or optimize performance. For example, a POE switch device 12 may determine that a first CBSD 22(1) is likely to experience a drop in load, while a second CBSD 22(2) is likely to experience a rise in load based on historical data 48. The POE switch device 12 can then request the first CBSD 22(1) downgrade from a CAT-B to a CAT-A power mode 44 to compensate for the expected increased load of the second CBSD 22(2).

The POE switch device 12 receives power from the CMTS 14 via the upstream POE port 24 and transfers power from the CMTS 14 to the plurality of CBSDs 22 via the corresponding plurality of downstream POE ports 26. The POE switch 12 also measures a power transfer rate from the CMTS 14 to the CMs 20 and/or CBSDs 22. The POE switch device 12 monitors for whether a power transfer rate from the CMTS 14 to the plurality of CBSDs 22 is outside of a predetermined range (e.g., above a predetermined threshold or below a predetermined threshold). If the POE switch device 12 determines the power transfer rate is outside of the predetermined range, the POE switch device 12 identifies one of the plurality of CBSDs 22 as a candidate for altering power requirements of the CBSD 22. For example, the POE switch device 12 determines to transmit the request to the first CBSD 22(1) based on at least one of current power requirements of each of the plurality of CBSDs 22, historical power requirements of each of the plurality of CBSDs 22, historical load of each of the plurality of CBSDs 22, and/or current load of each of the plurality of CBSDs 22. Based on the power transfer rate 34, the POE switch device 12 sends a request via the downstream POE port 26(1) to a first CBSD 22(1) of the plurality of CBSDs 22 to operate under a different power mode 44 than a current power mode 44 to alter a power requirement of the first CBSD 22(1).

The first CBSD 22(1) determines whether the first CBSD 22(1) should alter a power requirement. This may be based on current load requirements of the first CBSD 22(1). If the first CBSD 22(1) determines that the first CBSD 22(1) should change operation, the first CBSD 22(1) communicates with SAS 40 for permission to change operation. If SAS 40 determines that changing operation is acceptable, the first CBSD 22(1) changes operation and communicates confirmation to the POE switch device 12. In this way, the POE switch device 12 receives, from the first CBSD 22(1), confirmation that the first CBSD 22(1) is operating under the different power mode 44. This confirmation from the first CBSD 22(1) indicates that a SAS 40 granted a request from the first CBSD 22(1) to operate under the different power mode 44.

If either the first CBSD 22(1) or SAS 40 denies the request, the first CBSD 22(1) identifies another CBSD 22(2), 22(3) to contact. In this way, for example, the POE switch device 12 receives, from the first CBSD 22(1), a denial such that the first CBSD 22(1) continues operating under the current power mode 44. Based on the denial from the first CBSD 22(1), the POE switch device 12 requests via the downstream POE port 26 that a second CBSD 22(2) of the plurality of CBSDs 22 operates under a different power mode 44 than a current power mode 44 to alter a power requirement of the second CBSD 22(2).

As an example, the POE switch device 12 may determine the power transfer rate is below a predetermined threshold. The POE switch device 12, based on the power transfer rate being below the predetermined threshold, then requests the first CBSD 22(1) changes operation from a lower power mode 44 to a higher power mode 44. For example, the POE switch device 12 may request that the first CBSD 22(1) change operation from CAT-A to CAT-B.

As another example, the POE switch device 12 may determine a current load of the first CBSD 22(1) is low among the plurality of CBSDs 22 and/or the power transfer rate is above a predetermined threshold. The POE switch device 12, based on the power transfer rate being above a predetermined threshold and/or the current load of the first CBSD 22(1), then requests the first CBSD 22(1) changes operation from a higher power mode 44 to a lower power mode 44. For example, the POE switch device 12 may request that the first CBSD 22(1) change operation from CAT-B to CAT-A or from CAT-A to an off power mode 44.

Figure 2:
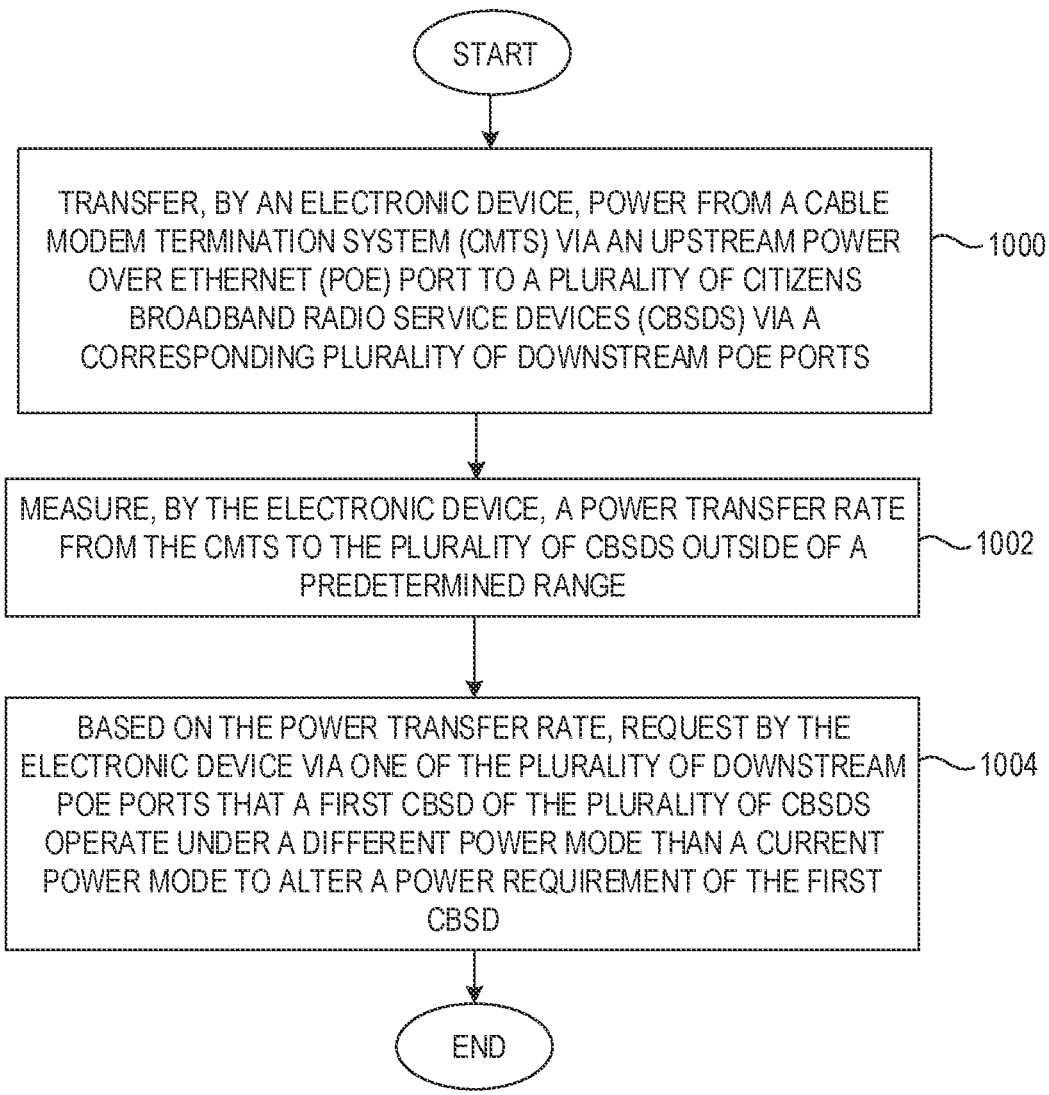
FIG. 2 is a flowchart illustrating processing steps for managing power over Ethernet using a POE switch device.

FIG. 2 is a flowchart illustrating processing steps for managing power over Ethernet using the POE switch device 12 of FIG. 1. The POE switch device 12 directs power transfer from a CMTS 14 via an upstream POE port 24 to a plurality of CBSDs 22 via a corresponding plurality of downstream POE ports 26 (1000). The POE switch device 12 determines a power transfer rate from the CMTS 14 to the plurality of CBSDs 22 is outside of a predetermined range (1002). The POE switch device 12, based on the power transfer rate, sends a request by the POE switch device 12 via one of the plurality of downstream POE ports 26 to a first CBSD 22(1) of the plurality of CBSDs 22 to operate under a different power mode 44 than a current power mode 44 to alter a power requirement of the first CBSD 22(1) (1004). In certain embodiments, the different power mode 44 is at least one of Category A, Category B, or an off power mode.

In certain embodiments, the POE switch device 12 determines the power transfer rate is below a predetermined threshold. Accordingly, the POE switch device 12, based on the power transfer rate being below the predetermined threshold, requests the first CBSD 22(1) changes operation from a lower power mode 44 to a higher power mode 44 (e.g., from CAT-A to CAT-B).

In certain embodiments, the POE switch device 12 determines the power transfer rate is above a predetermined threshold. Accordingly, the POE switch device 12, based on the power transfer rate being above a predetermined threshold, requests the first CBSD 22 changes operation from a higher power mode 44 to a lower power mode 44 (e.g., from CAT-B to CAT-A, or from CAT-A to power off mode).

Figure 3A:
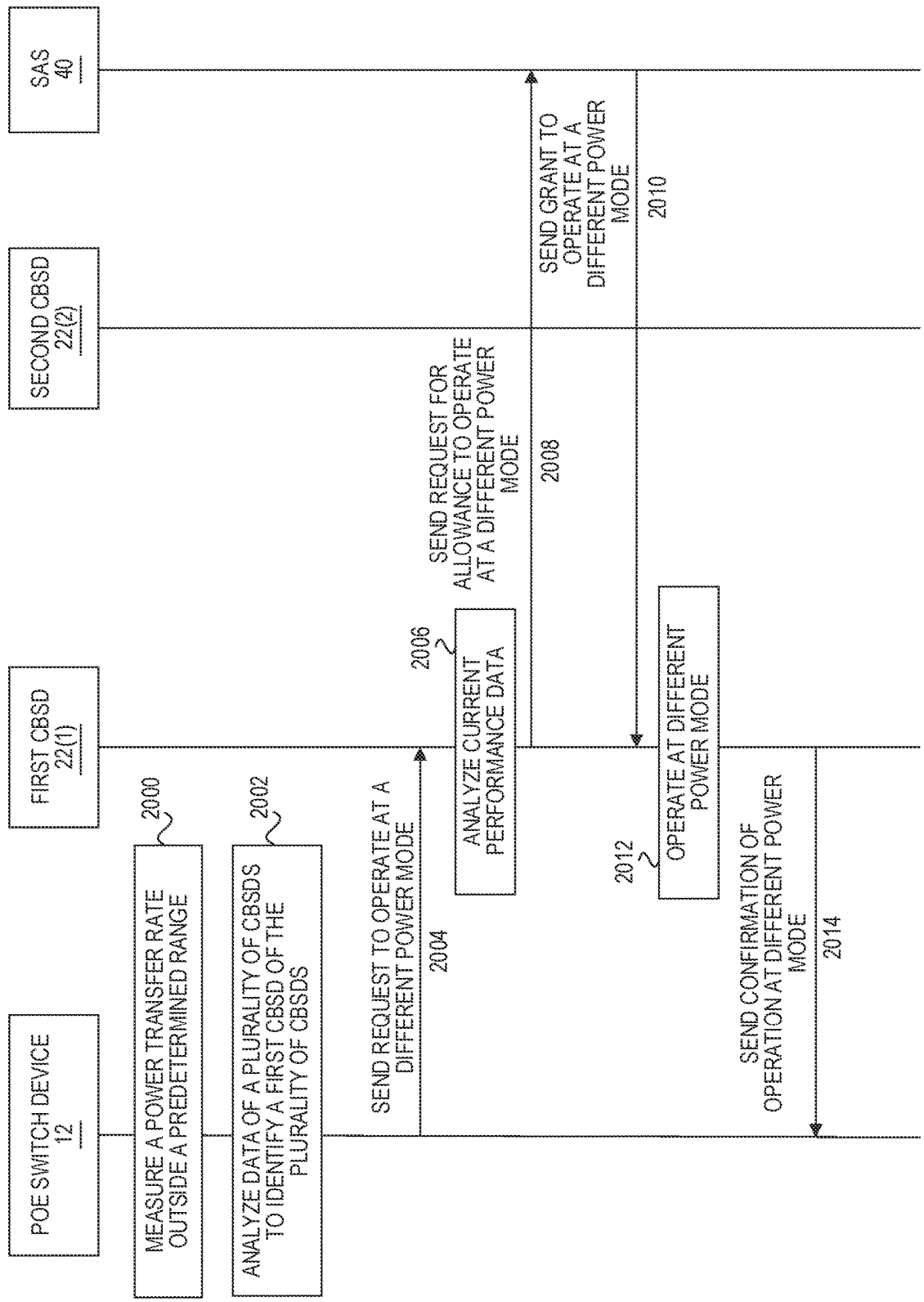
FIG. 3A is a message sequence diagram illustrating example messages communicated between and actions taken by several of the elements illustrated in FIG. 1 to confirm operation under a different power mode, according to one embodiment.
Figure 3B:
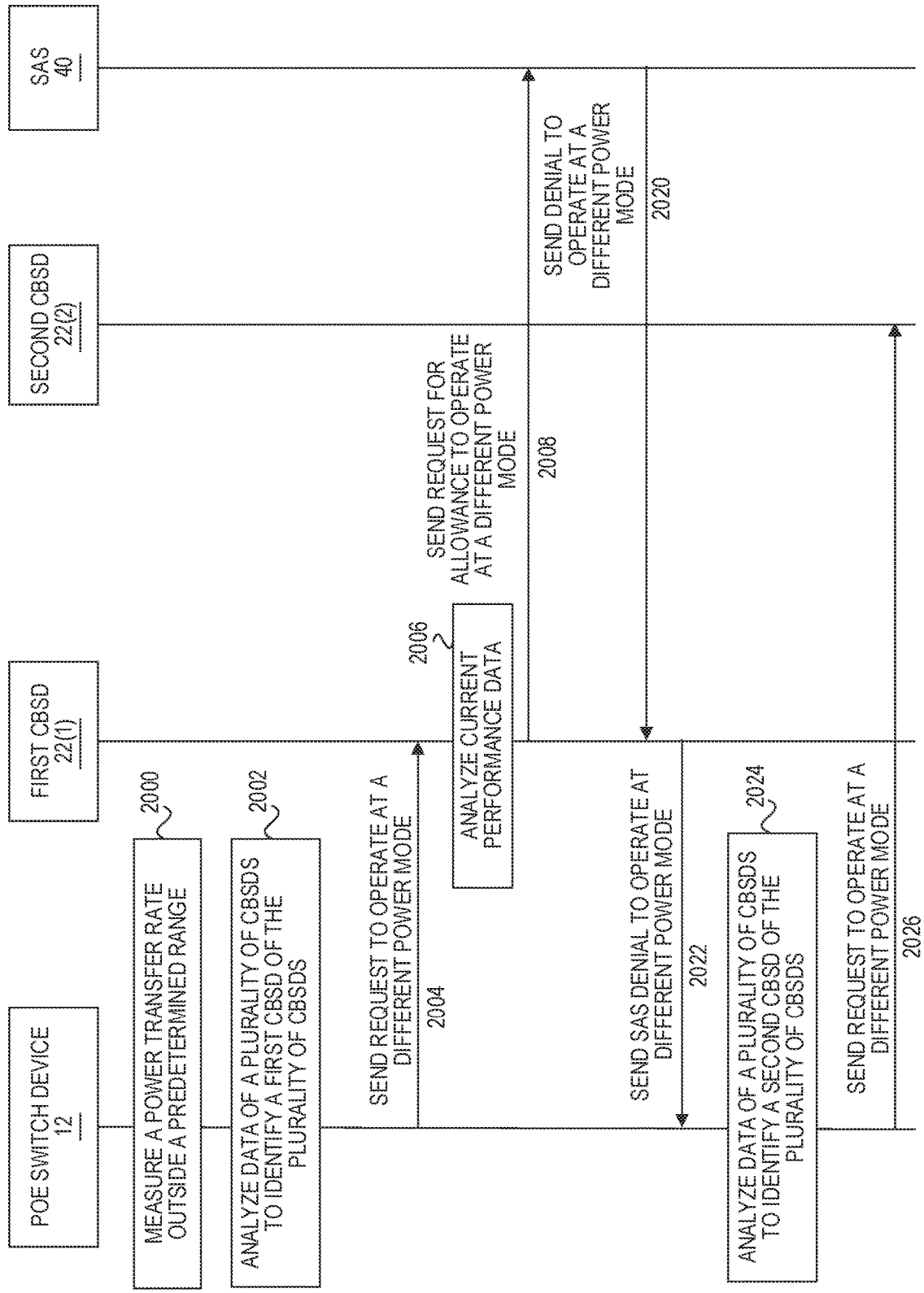
FIG. 3B is a message sequence diagram illustrating example messages communicated between and actions taken by several of the elements illustrated in FIG. 1 to deny, by a Spectrum Access System (SAS), operation of a Citizens Broadband Radio Service Device (CBSD) under a different power mode, according to one embodiment.
Figure 3C:
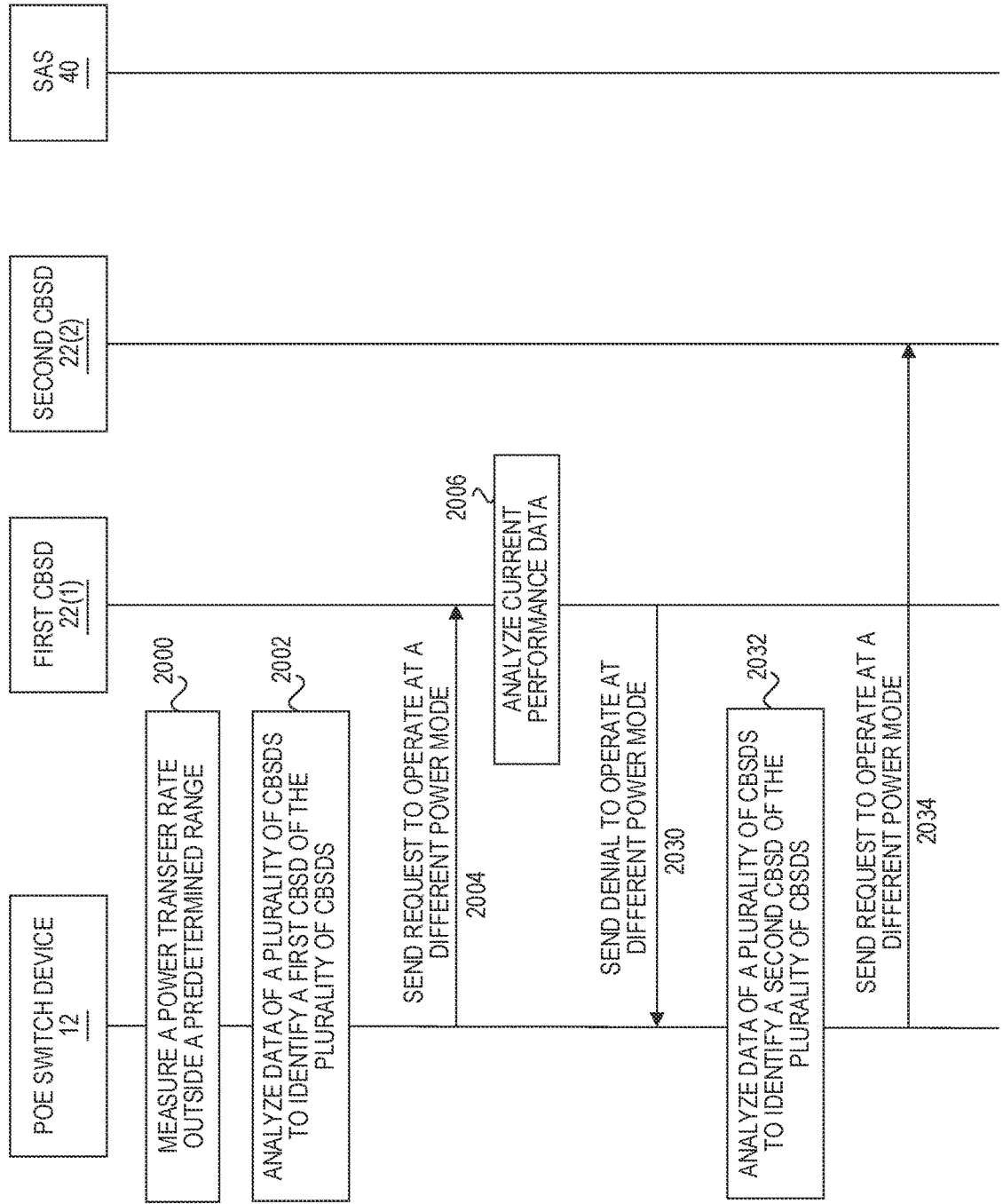
FIG. 3C is a message sequence diagram illustrating example messages communicated between and actions taken by several of the elements illustrated in FIG. 1 to deny, by the CBSD, operation under a different power mode, according to one embodiment.

FIGS. 3A-3C are message sequence diagrams illustrating example messages based on requests for a first CBSD 22(1) to operate at a different power mode 44.

FIG. 3A is a message sequence diagram illustrating example messages communicated between and actions taken by several of the elements illustrated in FIG. 1 to confirm operation under a different power mode 44, according to one embodiment. In this embodiment, the POE switch device 12 measures a power transfer rate 34 outside a predetermined range (2000). Then, the POE switch device 12 analyzes data of a plurality of CBSDs 22 to identify a first CBSD 22(1) of the plurality of CBSDs 22 (2002). The POE switch sends to the first CBSD 22(1) a request to operate under a different power mode 44 (2004). The first CBSD 22(1) analyzes current performance data (e.g., current load and/or power requirements) (2006). The first CBSD 22(1) determines that the first CBSD 22(1) can operate at the different power mode 44. For example, the first CBSD 22(1) may determine that the current load and/or power requirements are above an upper predetermined threshold or below a lower predetermined threshold. The first CBSD 22(1)

sends to a SAS 40 a request for grant to operate under the different power mode 44 (2008). SAS 40 sends a grant to the first CBSD 22(1) to operate at a different power mode (2010). The first CBSD 22(1) operates at a different power mode 44 (2012). The first CBSD 22(1) sends to the POE switch device 12 confirmation of operation at a different power mode 44 (2014).

FIG. 3B is a message sequence diagram illustrating example messages communicated between and actions taken by several of the elements illustrated in FIG. 1 to deny, by a Spectrum Access System (SAS), operation of a Citizens Broadband Radio Service Device (CBSD) under a different power mode 44, according to one embodiment. In this embodiment, the POE switch device 12 measures a power transfer rate 34 outside a predetermined range (2000). Then, the POE switch device 12 analyzes data of a plurality of CBSDs 22 to identify a first CBSD 22(1) of the plurality of CBSDs 22 (2002). The POE switch sends to the first CBSD 22(1) a request to operate under a different power mode 44 (2004). The first CBSD 22(1) analyzes current performance data (e.g., current load and/or power requirements) (2006). The first CBSD 22(1) determines that the first CBSD 22(1) can operate at the different power mode 44. For example, the first CBSD 22(1) may determine that the current load and/or power requirements are above an upper predetermined threshold or below a lower predetermined threshold. The first CBSD 22(1) sends a request to SAS 40 for grant to operate under the different power mode 44 (2008). However, the SAS 40 sends to the first CBSD 22(1) a denial to operate at a different power mode 44 (2020). For example, the SAS 40, based on the ESC 42, may determine that interference is too high. The first CBSD 22(1) sends to the POE switch device 12 the SAS 40 denial to operate at a different power mode 44 (2022). The POE switch device 12 analyzes data of a plurality of CBSDs 22 to identify a second CBSD 22(2) of the plurality of CBSDs 22 (2024). Accordingly, the POE switch device 12 sends to a second CBSD 22(2) a request to operate at a different mode (2026).

FIG. 3C is a message sequence diagram illustrating example messages communicated between and actions taken by several of the elements illustrated in FIG. 1 to deny, by the CBSD, operation under a different power mode 44, according to one embodiment. In this embodiment, the POE switch device 12 measures a power transfer rate 34 outside a predetermined range (2000). Then, the POE switch device 12 analyzes data of a plurality of CBSDs 22 to identify a first CBSD 22(1) of the plurality of CBSDs 22 (2002). The POE switch sends to the first CBSD 22(1) a request to operate under a different power mode 44 (2004). The first CBSD 22(1) analyzes current performance data (e.g., current load and/or power requirements) (2006). The first CBSD 22(1) determines that the first CBSD 22(1) cannot operate at the different power mode 44. For example, the first CBSD 22(1) may determine that the current load and/or power requirements are above an upper predetermined threshold. The first CBSD 22(1) sends to the POE switch device 12 a denial to operate at a different power mode 44 (2030). The POE switch device 12 analyzes data of the plurality of CBSDs 22 to identify a second CBSD 22(2) of the plurality of CBSDs 22 (2032). The POE switch device 12 sends to the second CBSD 22(2) a request to operate at a different power mode 44 (2034).

Figure 4:
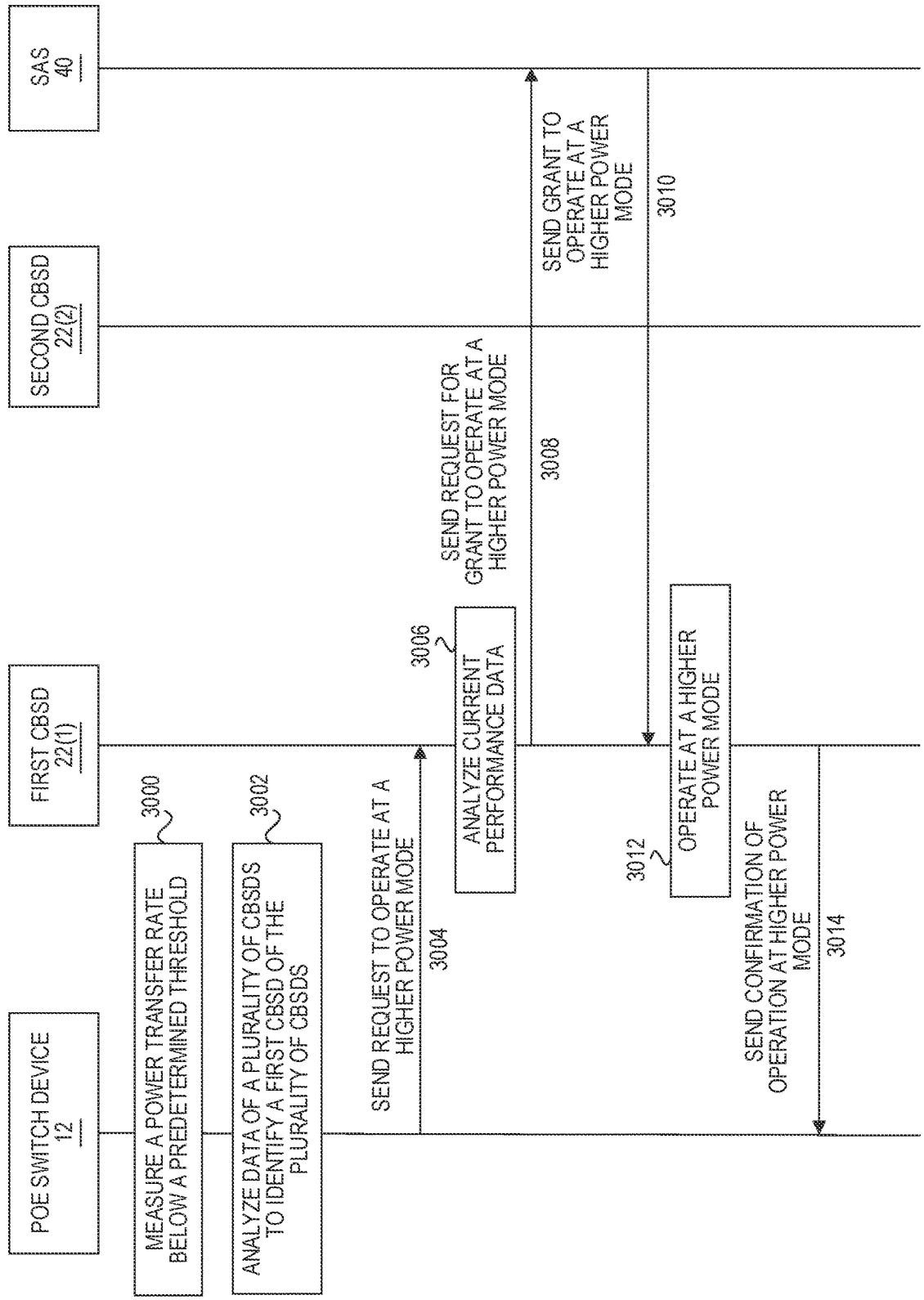
FIG. 4 is a message sequence diagram illustrating example messages communicated between and actions taken by several of the elements illustrated in FIG. 1 to confirm operation of a CBSD at a higher power mode based on a power transfer rate below a predetermined threshold, according to one embodiment.
Figure 5:
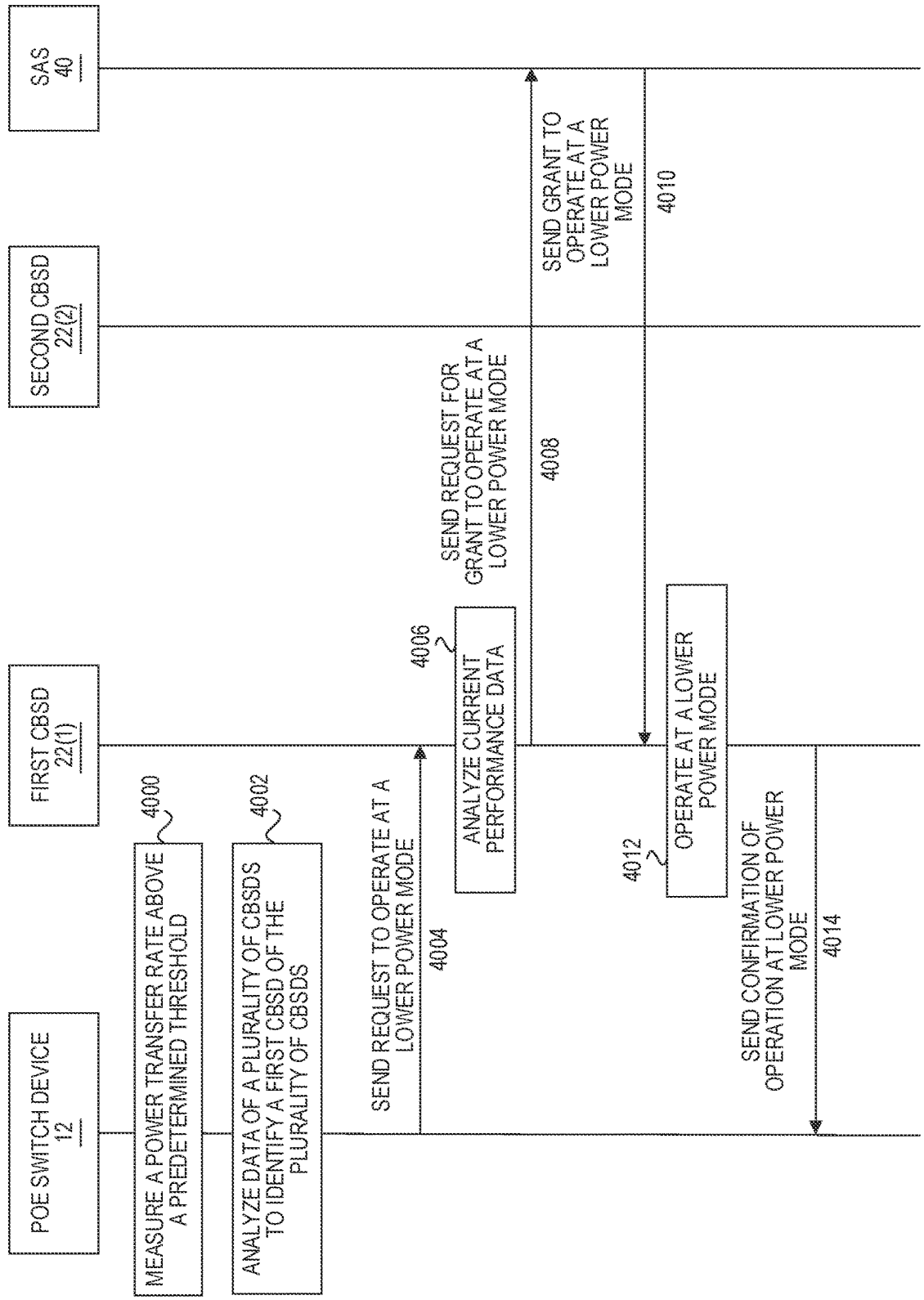
FIG. 5 is a message sequence diagram illustrating example messages communicated between and actions taken by several of the elements illustrated in FIG. 1 to confirm operation of a CBSD at a lower power mode based on a power transfer rate above a predetermined threshold, according to one embodiment.
Figure 6:
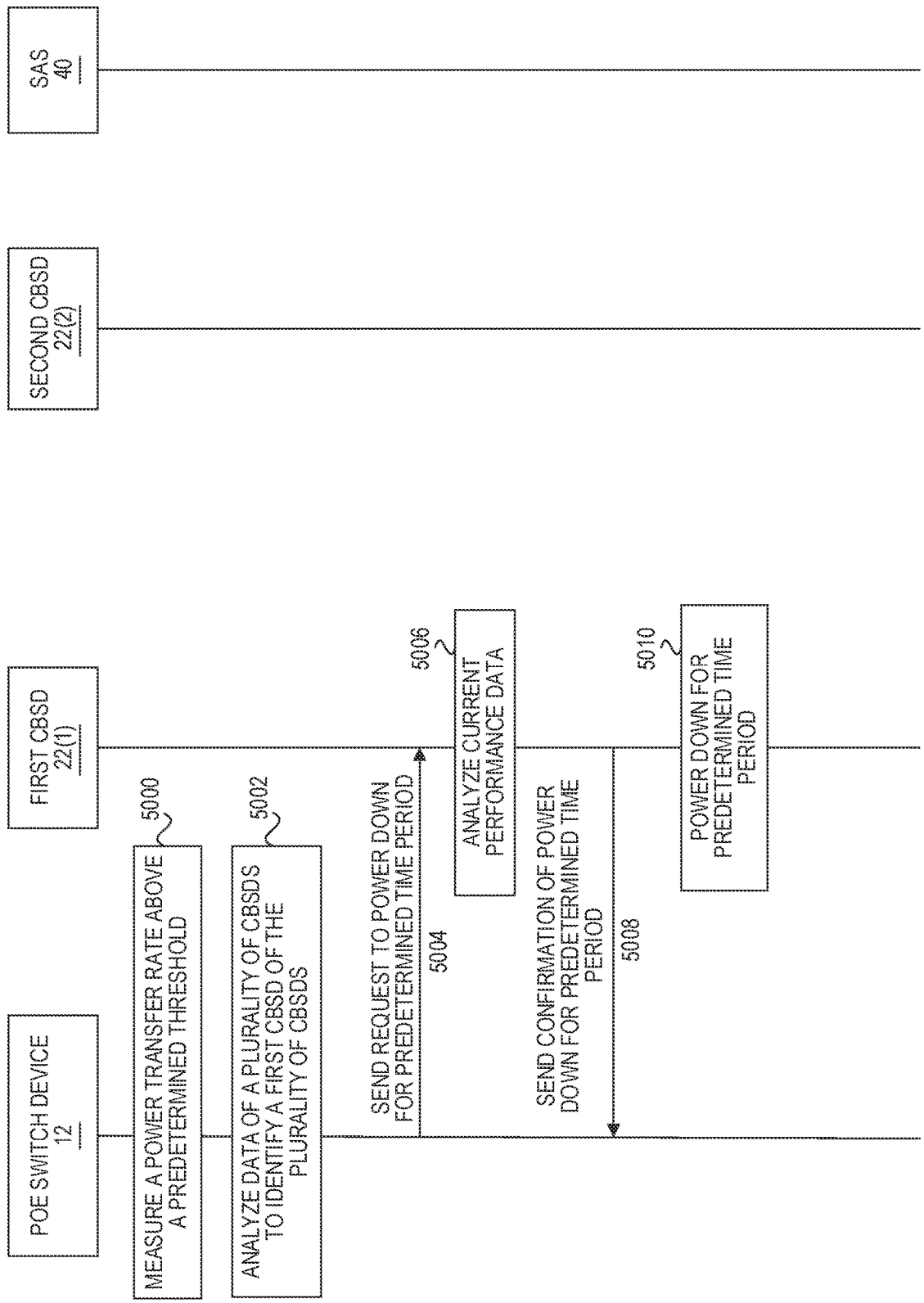
FIG. 6 is a message sequence diagram illustrating example messages communicated between and actions taken by several of the elements illustrated in FIG. 1 to confirm operation of a CBSD at an off power mode based on a power transfer rate above a predetermined threshold, according to one embodiment.

FIGS. 4-6 are sequence diagrams illustrating example messages based on different power transfer rates 34.

FIG. 4 is a message sequence diagram illustrating example messages communicated between and actions taken by several of the elements illustrated in FIG. 1 to confirm operation of a CBSD at a higher power mode 44 based on a power transfer rate 34 below a predetermined threshold, according to one embodiment. The POE switch device 12 measures a power transfer rate 34 below a predetermined threshold (3000). The POE switch device 12 analyzes data of a plurality of CBSDs 22 to identify a first CBSD 22(1) of the plurality of CBSDs 22 (3002). The POE switch device 12 sends to the first CBSD 22(1) a request to operate at a higher power mode 44 (3004). The first CBSD 22(1) analyzes current performance data (e.g., current load and/or power requirements) (3006). For example, the first CBSD 22(1) may determine that the current load and/or power requirements are below a lower predetermined threshold. The first CBSD 22(1) sends to an SAS 40 a request for grant to operate at a higher power mode 44 (e.g., CAT-B) (3008). The SAS 40 sends to the first CBSD 22(1) a grant to operate at a higher power mode 44 (e.g., CAT-B) (3010). The first CBSD 22(1) operates at a higher power mode 44 (e.g., CAT-B) (3012). The first CBSD 22 sends to the POE switch device 12 confirmation of operation at a higher power mode 44 (e.g., CAT-B) (3014).

FIG. 5 is a message sequence diagram illustrating example messages communicated between and actions taken by several of the elements illustrated in FIG. 1 to confirm operation of a CBSD at a lower power mode 44 based on a power transfer rate 34 above a predetermined threshold, according to one embodiment. The POE switch device 12 measures a power transfer rate 34 above a predetermined threshold (4000). The POE switch device 12 analyzes data of a plurality of CBSDs 22 to identify a first CBSD 22(1) of the plurality of CBSDs 22 (4002). The POE switch device 12 sends to the first CBSD 22(1) a request to operate a lower power mode 44 (e.g., CAT-A) (4004). The first CBSD 22(1) analyzes current performance data (e.g., current load and/or power requirements) (4006). For example, the first CBSD 22(1) may determine that the current load and/or power requirements are below a lower predetermined threshold. The first CBSD 22(1) sends to an SAS 40 a request for grant to operate at a lower power mode 44 (e.g., CAT-A) (4008). The SAS 40 sends to the first CBSD 22(1) a grant to operate at a lower power mode 44 (e.g., CAT-A) (4010). The first CBSD 22(1) operates at a lower power mode 44 (e.g., CAT-A) (4012). The first CBSD 22(1) sends to the POE switch device 12 confirmation of operation at a lower power mode 44 (e.g., CAT-A) (4014).

FIG. 6 is a message sequence diagram illustrating example messages communicated between and actions taken by several of the elements illustrated in FIG. 1 to confirm operation of a CBSD at an off power mode 44 based on a power transfer rate above a predetermined threshold, according to one embodiment. The POE switch device 12 measures a power transfer rate above a predetermined threshold (5000). The POE switch device 12 analyzes data of a plurality of CBSDs 22 to identify a first CBSD 22(1) of the plurality of CBSDs 22 (5002). The POE switch device 12 sends a request to power down for a predetermined time period (5004). The first CBSD 22(1) analyzes current performance data (e.g., current load and/or power requirements) (5006). For example, the first CBSD 22(1) may determine that the current load and/or power requirements are below a lower predetermined threshold. The first CBSD 22(1) sends to the POE switch device 12 confirmation of power down for the predetermined time period (5008). The first CBSD 22(1) powers down for the predetermined time period (5010).

Figure 7:
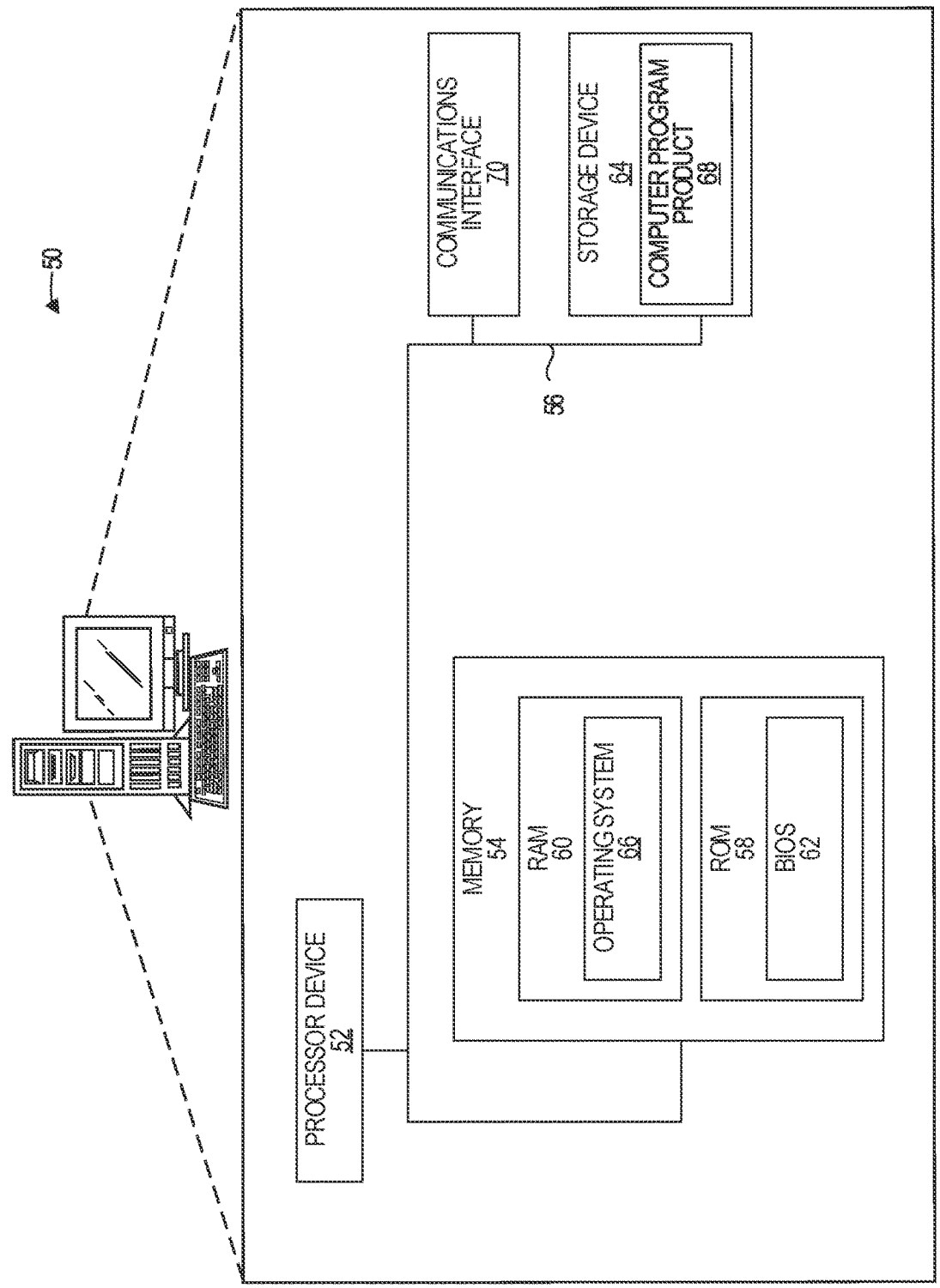
FIG. 7 is a block diagram of a computing device suitable for implementing one or more of the processing devices disclosed herein, according to one embodiment.

FIG. 7 is a block diagram of a computing device 50 containing components suitable for implementing any of the processing devices disclosed herein. The computing device 50 includes a processor device 52, a system memory 54, and a system bus 56. The system bus 56 provides an interface for system components including, but not limited to, the system memory 54 and the processor device 52. The processor device 52 can be any commercially available or proprietary processor.

The system bus 56 may be any of several types of bus structures that may further interconnect to a memory bus (with or without a memory controller), a peripheral bus, and/or a local bus using any of a variety of commercially available bus architectures. The system memory 54 may include non-volatile memory 58 (e.g., read-only memory (ROM), erasable programmable read-only memory (EPROM), electrically erasable programmable read-only memory (EEPROM), etc.), and volatile memory 60 (e.g., random-access memory (RAM)). A basic input/output system (BIOS) 62 may be stored in the non-volatile memory 58 and can include the basic routines that help transfer information between elements within the source computing device 50. The volatile memory 60 may also include a high-speed RAM, such as static RAM, for caching data.

The computing device 50 may further include or be coupled to a non-transitory computer-readable storage medium such as the storage device 64, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 64 and other drives associated with computer-readable media and computer-usable media may provide non-volatile storage of data, data structures, computer-executable instructions, and the like.

A number of modules can be stored in the storage device 64 and in the volatile memory 60, including an operating system 66 and one or more program modules, which may implement the functionality described herein in whole or in part. All or a portion of the examples may be implemented as a computer program product 68 stored on a transitory or non-transitory computer-usable or computer-readable storage medium, such as the storage device 64, which includes complex programming instructions, such as complex computer-readable program code, to cause the processor device 52 to carry out the steps described herein. Thus, the computer-readable program code can comprise software instructions for implementing the functionality of the examples described herein when executed on the processor device 52. The processor device 52, in conjunction with the network manager in the volatile memory 60, may serve as a controller or control system for the computing device 50 that is to implement the functionality described herein.

The computing device 50 may also include one or more communication interfaces 70, depending on the particular functionality of the computing device 50. The communication interfaces 70 may comprise one or more wired Ethernet transceivers, wireless transceivers, fiber, satellite, and/or coaxial interfaces by way of non-limiting examples.

Those skilled in the art will recognize improvements and modifications to the preferred embodiments of the disclosure. All such improvements and modifications are considered within the scope of the concepts disclosed herein and the claims that follow.

What is claimed is:

1. An electronic device, comprising:
    an upstream Power Over Ethernet (POE) port configured to receive power from a cable modem termination system (CMTS);
    a plurality of downstream POE ports configured to transfer power to a corresponding plurality of Citizens Broadband Radio Service Devices (CBSDs);
    a memory; and
    a processor device coupled to the memory and configured to:
        transfer power from the CMTS to the plurality of CBSDs via the corresponding plurality of downstream POE ports;
        determine a combined power transfer rate from the CMTS to the plurality of CBSDs is outside of a predetermined range;
        based on the combined power transfer rate, send a request via one of the plurality of downstream POE ports to a first CBSD of the plurality of CBSDs to operate under a different power mode than a current power mode to alter a power requirement of the first CBSD.

2. The electronic device of claim 1, wherein the processor device is further configured to receive, from the first CBSD, confirmation that the first CBSD is operating under the different power mode.

3. The electronic device of claim 2, wherein the confirmation from the first CBSD indicates that a Spectrum Access System (SAS) granted a request from the first CBSD to operate under the different power mode.

4. The electronic device of claim 1, wherein the processor device is further configured to receive, from the first CBSD, a denial such that the first CBSD continues operating under the current power mode.

5. The electronic device of claim 4, wherein the processor device is further configured to, based on the denial from the first CBSD, request via one of the plurality of downstream POE ports that a second CBSD of the plurality of CBSDs operate under a different power mode than a current power mode to alter a power requirement of the second CBSD.

6. The electronic device of claim 1,
    wherein the different power mode is at least one of Category A or Category B;
    wherein Category A is a lower power mode permitting maximum Effective Isotropic Radiated Power (EIRP) of about 1 Watt; and
    wherein Category B is a higher power mode permitting maximum EIRP of about 50 Watts.

7. The electronic device of claim 1,
    wherein determining the combined power transfer rate is outside of a predetermined range comprises determining the combined power transfer rate is below a predetermined threshold;
    wherein requesting the first CBSD operates under the different power mode comprises based on the combined power transfer rate being below the predetermined threshold, requesting the first CBSD changes operation from a lower power mode to a higher power mode.

8. The electronic device of claim 1,
    wherein determining the combined power transfer rate is outside of a predetermined range comprises determining the combined power transfer rate is above a predetermined threshold;
    wherein requesting the first CBSD operates under the different power mode comprises based on the combined power transfer rate being above a predetermined threshold, requesting the first CBSD changes operation from a higher power mode to a lower power mode.

9. The electronic device of claim 1,
further comprising determining, by the electronic device, a current load of the first CBSD is low among the plurality of CBSDs;
wherein determining the combined power transfer rate is outside of a predetermined range comprises determining the combined power transfer rate is above a predetermined threshold;
wherein requesting the first CBSD operates under the different power mode comprises based on the combined power transfer rate being above a predetermined threshold and the current load of the first CBSD, requesting the first CBSD changes operation from a higher power mode to a lower power mode.

10. The electronic device of claim 1,
further comprising determining, by the electronic device, a current load of the first CBSD is low among the plurality of CBSDs;
wherein determining the combined power transfer rate is outside of a predetermined range comprises determining the combined power transfer rate is above a predetermined threshold;
wherein requesting the first CBSD operates under the different power mode comprises based on the combined power transfer rate being above a predetermined threshold and the current load of the first CBSD, requesting the first CBSD changes operation to an off power mode for a predetermined time period.

11. The electronic device of claim 1, wherein the processor device is further configured to receive from the first CBSD at least one of media access control (MAC) address, power mode type, average load during a predetermined time period, high load time during a predetermined time period, power-related issue, or a power limit range.

12. The electronic device of claim 1, wherein the processor device is further configured to determine to transmit the request to the first CBSD based on at least one of current power requirements of each of the plurality of CBSDs, historical power requirements of each of the plurality of CBSDs, historical load of each of the plurality of CBSDs, or current load of each of the plurality of CBSDs.

13. The electronic device of claim 1, wherein the processor device is further configured to manage power transfer among the plurality of CBSDs to maximize the combined power transfer rate to the plurality of CBSDs under a predetermined power transfer rate limit.

14. The electronic device of claim 1, wherein the processor device is further configured to manage power transfer among the plurality of CBSDs to maximize load across the plurality of CBSDs.

15. The electronic device of claim 1, wherein the electronic device is in electronic communication with the first CBSD via a first cable modem (CM).

16. A method, comprising:
directing, by an electronic device, power transfer from a cable modem termination system (CMTS) via an upstream Power Over Ethernet (POE) port to a plurality of Citizens Broadband Radio Service Devices (CBSDs) via a corresponding plurality of downstream POE ports;
determining, by the electronic device, a combined power transfer rate from the CMTS to the plurality of CBSDs outside of a predetermined range;
based on the combined power transfer rate, sending a request by the electronic device via one of the plurality of downstream POE ports to a first CBSD of the plurality of CBSDs to operate under a different power mode than a current power mode to alter a power requirement of the first CBSD.

17. The method of claim 16,
wherein the different power mode is at least one of Category A or Category B;
wherein Category A is a lower power mode permitting maximum Effective Isotropic Radiated Power (EIRP) of about 1 Watt; and
wherein Category B is a higher power mode permitting maximum EIRP of about 50 Watts.

18. The method of claim 16,
wherein determining the combined power transfer rate is outside of a predetermined range comprises determining the combined power transfer rate is below a predetermined threshold;
wherein requesting the first CBSD operates under the different power mode comprises based on the combined power transfer rate being below the predetermined threshold, requesting the first CBSD changes operation from a lower power mode to a higher power mode.

19. The method of claim 16,
wherein determining the combined power transfer rate is outside of a predetermined range comprises determining the combined power transfer rate is above a predetermined threshold;
wherein requesting the first CBSD operates under the different power mode comprises based on the combined power transfer rate being above a predetermined threshold, requesting the first CBSD changes operation from a higher power mode to a lower power mode.

20. The method of claim 16, further comprising receiving, by the electronic device, from the first CBSD at least one of media access control (MAC) address, power mode type, an average load during a predetermined time period, a high load time during a predetermined time period, a power-related issue, or a power limit range.

* * * * *